United States Patent
He et al.

(10) Patent No.: US 12,513,552 B2
(45) Date of Patent: Dec. 30, 2025

(54) METHOD AND APPARATUS FOR DETECTING EVENT IN COMMUNICATION NETWORK

(71) Applicant: Telefonaktiebolaget LM Ericsson (publ), Stockholm (SE)

(72) Inventors: Zhenhua He, Guangzhou (CN); Min Liu, Guangzhou (CN); Yanning Liu, Plano, TX (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 346 days.

(21) Appl. No.: 18/043,573

(22) PCT Filed: Sep. 27, 2020

(86) PCT No.: PCT/CN2020/118128
§ 371 (c)(1),
(2) Date: Feb. 28, 2023

(87) PCT Pub. No.: WO2022/061813
PCT Pub. Date: Mar. 31, 2022

(65) Prior Publication Data
US 2023/0276286 A1    Aug. 31, 2023

(51) Int. Cl.
*H04W 24/10* (2009.01)
(52) U.S. Cl.
CPC ................................ *H04W 24/10* (2013.01)
(58) Field of Classification Search
CPC ..... H04W 24/10; H04W 76/19; H04W 24/02; H04W 24/04; H04L 41/142; H04L 41/16;
(Continued)

(56) References Cited

U.S. PATENT DOCUMENTS 7,424,619 B1    9/2008 Fan et al.
9,450,978 B2    9/2016 Vasseur et al.
(Continued)

FOREIGN PATENT DOCUMENTS

CN    102970698 A    3/2013
CN    103236127 A    8/2013
(Continued)

OTHER PUBLICATIONS

International Search Report and Written Opinion for Application No. PCT/CN2020/118128, Jun. 30, 2021, 10 pages.
(Continued)

*Primary Examiner* — Chuong A Ngo
(74) *Attorney, Agent, or Firm* — Nicholson De Vos Webster & Elliott LLP

(57) ABSTRACT

A method and apparatus for detecting event in a communication network. The method performed at a network node may comprise: obtaining at least one parameter associated to an event; determining, by a first classifier, whether a first measurement result of the at least one parameter satisfies at least one rule; classifying, by a second classifier, a second measurement result of the at least one parameter, when the first measurement result of the at least one parameter satisfies the at least one rule; and determining whether the event happens based on a classifying result of the second measurement result of the at least one parameter. More than one classifier may be cascaded, so as to reduce a misdetection rate.

18 Claims, 8 Drawing Sheets

(58) Field of Classification Search
CPC .. H04L 41/5009; G06F 11/0754; G06N 20/10
See application file for complete search history.

(56) References Cited

U.S. PATENT DOCUMENTS

| | | | |
|---|---|---|---|
| 2006/0074829 A1 | 4/2006 | Aklilu et al. | |
| 2010/0199345 A1* | 8/2010 | Nadir | H04L 63/14 726/22 |
| 2019/0098035 A1 | 3/2019 | Periaswamy et al. | |
| 2020/0343945 A1* | 10/2020 | Stephenne | H04W 72/20 |
| 2021/0342429 A1* | 11/2021 | Balakrishnan | G06F 21/32 |
| 2022/0210031 A1* | 6/2022 | Hu | H04L 43/55 |
| 2024/0396907 A1* | 11/2024 | Beauchesne | H04L 63/1416 |

FOREIGN PATENT DOCUMENTS

| | | |
|---|---|---|
| CN | 104572329 A | 4/2015 |
| CN | 107241350 A | 10/2017 |
| CN | 111130840 A | 5/2020 |

OTHER PUBLICATIONS

Mikel Galar et al., "A Review on Ensembles for the Class Imbalance Problem: Bagging-, Boosting-, and Hybrid-Based Approaches," 2011, pp. 463-484, IEEE Transactions on Systems, Man and Cybernetics—Part C: Applications and Reviews, vol. 42, No. 4, Jul. 2012.

Xu-Ying Liu et al., "Exploratory Undersampling for Class-Imbalance Learning," 2008, pp. 539-550, IEEE Transactions on Systems, Man, and Cybernetics—Part B: Cybernetics, vol. 39, No. 2, Apr. 2009.

"Support vector machine," Dec. 18, 2020, 18 pages, Wikipedia, downloaded from https://en.wikipedia.org/w/index.php?title=Support_vector_machine&oldid=994938922 on Feb. 28, 2023.

Extended European Search Report, EP App. No. 20954664.7, May 3, 2024, 9 pages.

International Preliminary Report on Patentability, Application No. PCT/CN2020/118128, Apr. 6, 2023, 5 pages.

Kok-Chin Khor et al., "A cascaded classifier approach for improving detection rates on rare attack categories in network intrusion detection", 2010, 10 pages, Appl Intell (2012).

* cited by examiner

Data Sample

| DL Tput | Connected User | PRB Usage | Feature-4 | Feature-7 | Feature-3 | Feature-2 | Feature-6 | Feature-5 | Feature-1 |
|---|---|---|---|---|---|---|---|---|---|
| 12193.490 | 5.622 | 12.333 | | | | | | | |
| 10894.293 | 5.206 | 5.667 | | | | | | | |
| 5807.490 | 4.756 | 5.000 | | | | | | | |
| 7154.661 | 3.833 | 5.000 | | | | | | | |
| 177.981 | 19.689 | 5.000 | | | | | | | |
| 444.269 | 27.794 | 5.000 | | | | | | | |
| 346.391 | 32.078 | 5.000 | | | | | | | |
| 451.723 | 33.872 | 5.000 | 5.622 | 12193.490 | 33.872 | 19.689 | 451.723 | 177.981 | 5.000 |

FIG. 6

METHOD AND APPARATUS FOR DETECTING EVENT IN COMMUNICATION NETWORK

CROSS-REFERENCE TO RELATED APPLICATIONS

This application is a National stage of International Application No. PCT/CN2020/118128, filed Sep. 27, 2020, which is hereby incorporated by reference.

TECHNICAL FIELD

The present disclosure relates generally to the technology of wireless communication, and in particular, to a method and an apparatus for detecting event in a communication network.

BACKGROUND

This section introduces aspects that may facilitate better understanding of the present disclosure. Accordingly, the statements of this section are to be read in this light and are not to be understood as admissions about what is in the prior art or what is not in the prior art.

In the wireless communication system, it is important to be aware of an operation status of the network. Specifically, the operation statuses of some network nodes have to be monitored.

However, most of the statuses cannot be obtained directly. For example, a failed network node cannot report that it has failed. Such statuses have to be detected by another network node, based on some parameters associated to the failed network node, or by other means, e.g. reported by the users, etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Conventionally, to detecting the event, e.g. a failure event for a network node, at least one parameter and a corresponding rule set, including at least one rule, may be set for a specific event. If a measurement result of the at least one parameter satisfies a rule in the rule set, then it may be determined that the event happens. However, it is hard to find an accurate rule set for some events. The misdetection rate of some event might be very high.

Certain aspects of the present disclosure and their embodiments may provide solutions to these or other challenges. There are, proposed herein, various embodiments which address one or more of the issues disclosed herein. Improved methods and apparatuses are provided for detecting event in a communication network. Particularly, more than one classifier may be cascaded, so as to reduce a misdetection rate.

A first aspect of the present disclosure provides a method at a network node, comprising: obtaining at least one parameter associated to an event; determining, by a first classifier, whether a first measurement result of the at least one parameter satisfies at least one rule; classifying, by a second classifier, a second measurement result of the at least one parameter, when the first measurement result of the at least one parameter satisfies the at least one rule; and determining whether the event happens based on a classifying result of the second measurement result of the at least one parameter.

In embodiments of the present disclosure, the method further comprises: determining a threshold used in the at least one rule for determining whether a first measurement result of the at least one parameter satisfies at least one rule, based on a training result of the second classifier.

In embodiments of the present disclosure, the threshold comprises a vector.

In embodiments of the present disclosure, determining a threshold used in the at least one rule comprises: obtaining a plurality of samples, wherein each sample includes a historic measurement result of the at least one parameter, and each sample is previously labeled as the event or not the event; selecting a candidate threshold from a plurality of candidate thresholds; determining, by the first classifier, whether each sample satisfies the at least one rule including the selected candidate threshold; training the second classifier with at least one sample which satisfies the at least one rule including the selected candidate threshold; determining a classifying score of the second classifier associated to the selected candidate threshold, based on a training result; and determining the selected candidate threshold as the threshold used in the at least one rule, when the selected candidate threshold corresponds to a highest classifying score among the plurality of candidate thresholds.

In embodiments of the present disclosure, the at least one sample comprises at least one sample labelled as the event, and at least one sample labelled as not the event.

In embodiments of the present disclosure, the second classifier comprises a machine learning classifier.

In embodiments of the present disclosure, the second classifier comprises a support vector machine, SVM, classifier.

In embodiments of the present disclosure, a kernel of the SVM classifier comprises a Radial Basis Function, RBF.

In embodiments of the present disclosure, the first and/or the second measurement result comprises a feature value of the at least one parameter.

In embodiments of the present disclosure, the feature value is generated based on a plurality of measurement values of the at least one parameter; and the at least one parameter is measured periodically.

In embodiments of the present disclosure, the feature value comprises at least one of: a maximum value of the plurality of measurement values; a minimum value of the plurality of measurement values; and a fluctuation degree of the plurality of measurement values.

In embodiments of the present disclosure, the event comprises: a near silent issue, NSI, of a base station.

In embodiments of the present disclosure, the at least one parameter comprises at least one key performance indictor parameter.

In embodiments of the present disclosure, the key performance indictor parameter comprises at least one of: a quantity number of connected users; a downlink user throughput; and a downlink physical resource block usage.

In embodiments of the present disclosure, the network node comprises an operation, administration and maintenance, OAM.

A second aspect of the present disclosure provides a network node, comprising: a processor; and a memory, the memory containing instructions executable by the processor. The network node is operative to: obtain at least one parameter associated to an event; determine, by a first classifier, whether a first measurement result of the at least one parameter satisfies at least one rule; classify, by a second classifier, a second measurement result of the at least one parameter, when the first measurement result of the at least one parameter satisfies the at least one rule; and determine whether the event happens based on a classifying result of the second measurement result of the at least one parameter.

In embodiments of the present disclosure, the network node is further operative to perform the method according to any of embodiments described above.

A third aspect of the present disclosure provides a computer-readable storage medium storing instructions which when executed by at least one processor, cause the at least one processor to perform the method according to any one of embodiments described above.

A fourth aspect of the present disclosure provides a network node, comprising: a obtaining unit, configured to obtain at least one parameter associated to an event; a first classifier unit, configured to determine whether a first measurement result of the at least one parameter satisfies at least one rule; a second classifier unit, configured to classify a second measurement result of the at least one parameter, when the first measurement result of the at least one parameter satisfies the at least one rule; and a determining unit, configured to determine whether the event happens based on a classifying result of the second measurement result of the at least one parameter.

In embodiments of the present disclosure, the network node is further operative to perform the method according to any of embodiments above mentioned.

Embodiments herein afford many advantages. For example, in embodiments herein, more than one classifier may be cascaded, so as to reduce a misdetection rate. A person skilled in the art will recognize additional features and advantages upon reading the following detailed description.

BRIEF DESCRIPTION OF DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 6 is an exemplary diagram showing a data sample, according to embodiments of the present disclosure.

DETAILED DESCRIPTION

Figure 1:
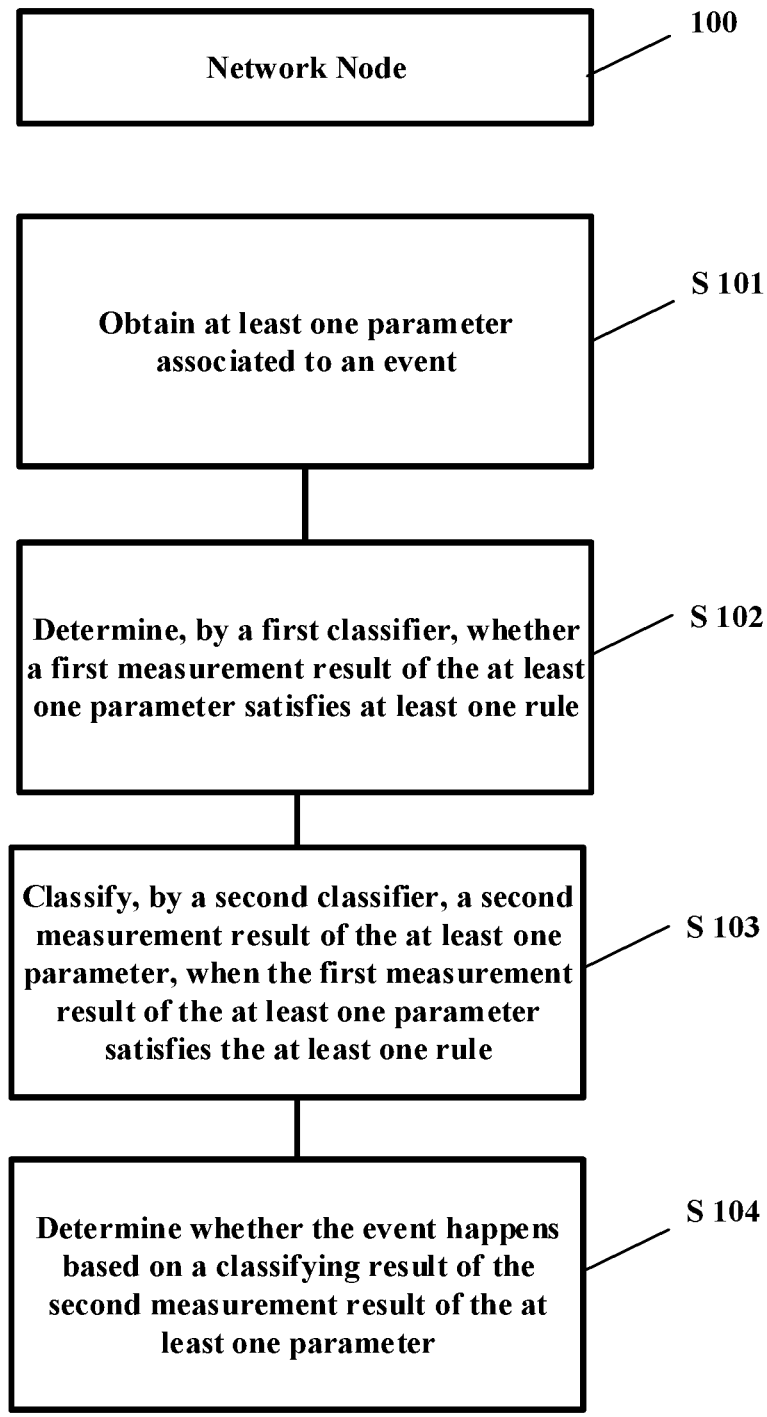
FIG. 1 is an exemplary flow chart showing a method performed at a network node, according to embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the term "network" or "communication network" refers to a network following any suitable wireless communication standards. For example, the wireless communication standards may comprise $5^{th}$ generation (5G), new radio (NR), $4^{th}$ generation (4G), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP) or the wired communication protocols.

The term "network node" used herein refers to a network device or network entity or network function or any other devices (physical or virtual) in a communication network. For example, the network node in the network may include a base station (BS), an access point (AP), a multi-cell/multicast coordination entity (MCE), a server node/function (such as a service capability server/application server, SCS/AS, group communication service application server, GCS AS, application function, AF), an exposure node/function (such as a service capability exposure function, SCEF, network exposure function, NEF), a unified data management, UDM, a home subscriber server, HSS, a session management function, SMF, an access and mobility management function, AMF, a mobility management entity, MME, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like.

Further, the term "network node" may also refer to any suitable function which can be implemented in a network entity (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (Network Repository Function), RAN (radio access network), SCP (service communication proxy), OAM (Operation Administration and Maintenance) etc. In other embodiments, the network function may comprise different types of NFs (such as PCRF (Policy and Charging Rules Function), etc.) for example depending on the specific network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and (or) B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

In the communication system, it is hard to find an accurate rule set for some events. For example, one kind of silent issue in LTE eNodeB system is called near silent issue, which may be defined as below.

NSI (Near Silent issue): System will not raise any alarm and everything looks good, but DL (downlink) UE throughput stuck at an unreasonably low level compared to historical normal situation forever until node is restarted. Meanwhile, the average RRC (radio resource control) connection increases quickly and PRB usage keeps in a very low level, e.g. 5%.

The near silent issue is a kind of extremely rare event. For example, if there are 20,000 eNodeB, about 5 near silent issues would happen in a month. If the KPI (Key Performance Indicator) data sampling cycle is 15 minutes, then the detection accuracy needs to be close to 1−5/(20000*96) =99.9997%. Hence, the dataset is extremely imbalanced.

One challenge is not to miss real issue but to avoid false alarms because either missing real issue and false alert are harmful to subscribers' user experience, and the service of the eNodeB cannot be maintained. Namely, both high recall/detection rate and precision are important.

Another challenge is that there is no much labelled data and there are not many real issues in the field. Hence, it is also a small sample problem.

Conventionally, when the eNodeB enters NSI state and the KPI can't recover after a long period, there is no effective way to detect it as it is an extremely rare event. It has to depend on end user to report it.

General anomaly detection method can't solve the problem, because near silent issue is only one of the various anomalies. Especially, when the eNodeB is a very low usage site, it's easy to be falsely considered as entering NSI state.

Ensemble method or sampling method such as down sampling or over sampling is common way to handle class imbalance problem, however it cannot handle extreme imbalance problem and they will be troubled by noisy data in real eNodeB environment.

Therefore, in the communication system, improved methods and apparatuses are needed to detect some events which cannot be associated to an accurate rule set.

FIG. 1 is an exemplary flow chart showing a method performed at a network node, according to embodiments of the present disclosure.

As shown in FIG. 1, the method performed at the network node 100 may comprise: S101, obtaining at least one parameter associated to an event; S102, determining, by a first classifier, whether a first measurement result of the at least one parameter satisfies at least one rule; S103, classifying, by a second classifier, a second measurement result of the at least one parameter, when the first measurement result of the at least one parameter satisfies the at least one rule; and S104, determining whether the event happens based on a classifying result of the second measurement result of the at least one parameter.

It should be understood that the at least one parameter associated to an event may comprise any parameter which could be used directly or indirectly to indicate whether the event happens. Further, such parameter may be measured, calculated and received, etc., by the network node 100.

According to embodiments herein, more than one classifier may be cascaded, so as to reduce a misdetection rate. Specifically, the first classifier (including at least one rule) can be used to preliminarily limit the situations to be judged, so as to avoid too many false alarms, particularly for some rare events. Then, the second classifier can be used to make more accurate classifying process.

Figure 2:
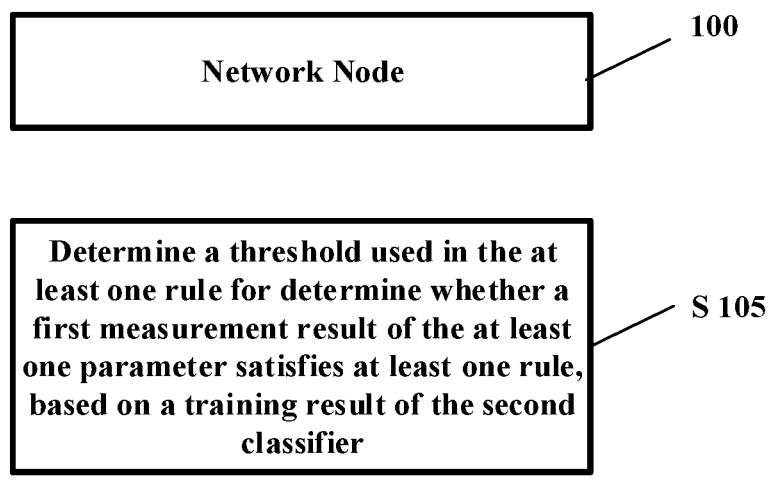
FIG. 2 is an exemplary flow chart showing an additional step of the method performed at the network node, according to embodiments of the present disclosure.

FIG. 2 is an exemplary flow chart showing an additional step of the method performed at the network node, according to embodiments of the present disclosure.

In embodiments of the present disclosure, the method further comprises: S105, determining a threshold used in the at least one rule for determining whether a first measurement result of the at least one parameter satisfies at least one rule, based on a training result of the second classifier.

According to embodiments herein, not only the first classifier helps to limit the measurements needed to be classified by the second classifier, but also the training result of the second classifier in turn helps to adjust a threshold used in the at least one rule for detecting the event. Therefore, positive feedbacks could be generated between the first classifier and the second classifier. The classifying process may be more accurate.

In embodiments of the present disclosure, the threshold comprises a vector. Namely, one or more than one threshold values for the at least one rule may be adjusted.

Figure 3:
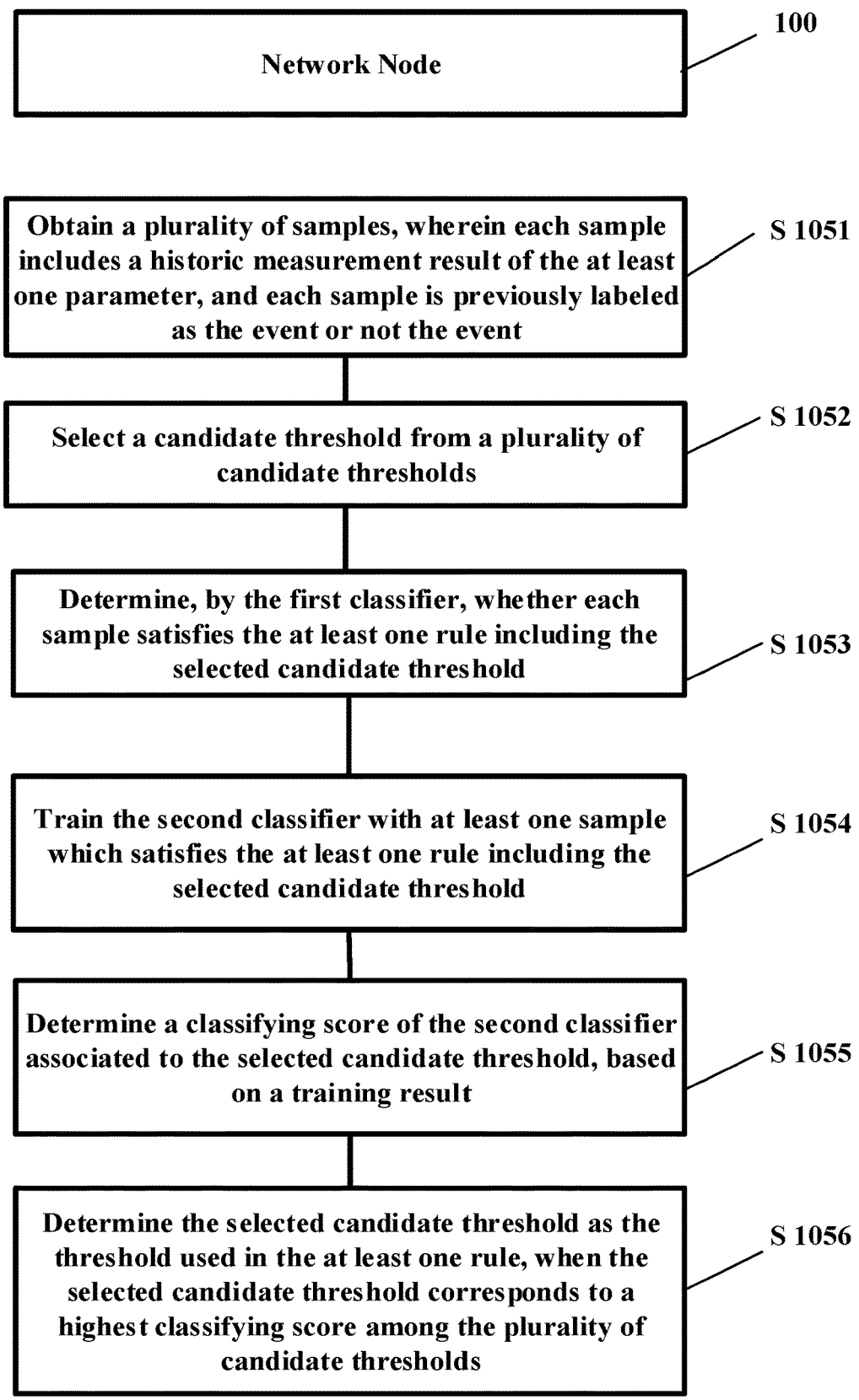
FIG. 3 is an exemplary flow chart showing substeps of the method performed at the network node, according to embodiments of the present disclosure.

FIG. 3 is an exemplary flow chart showing substeps of the method performed at the network node, according to embodiments of the present disclosure.

In embodiments of the present disclosure, determining a threshold used in the at least one rule comprises: S1051, obtaining a plurality of samples, wherein each sample includes a historic measurement result of the at least one parameter, and each sample is previously labeled as the event or not the event; S1052, selecting a candidate threshold from a plurality of candidate thresholds; S1053, determining, by the first classifier, whether each sample satisfies the at least one rule including the selected candidate threshold; S1054, training the second classifier with at least one sample which satisfies the at least one rule including the selected candidate threshold; S1055, determining a classifying score of the second classifier associated to the selected candidate threshold, based on a training result; and S1056, determining the selected candidate threshold as the threshold used in the at least one rule, when the selected candidate threshold corresponds to a highest classifying score among the plurality of candidate thresholds.

According to embodiments herein, the procedures for determining thresholds associated to the first classifier and training (any possible models of) the second classifier may be jointly performed. Further, these procedures may be performed, using the same historic samples. The efficiency and the accuracy may be further improved.

Further, the classifying score may in fact reflect the cascaded classifying result of the first classifier and the second classifier. Thus, rather than only considering the accuracy of a single classifier separately, the cascaded classifiers as a whole can be optimized.

Further, for better training result of the second classifier, the at least one sample may comprise at least one sample labelled as the event, and at least one sample labelled as not the event. Namely, both positive sample and negative sample may be utilized.

In embodiments of the present disclosure, the second classifier comprises a machine learning classifier.

In embodiments of the present disclosure, the second classifier comprises a support vector machine, SVM, classifier.

In embodiments of the present disclosure, a kernel of the SVM classifier comprises a Radial Basis Function, RBF.

It should be understood, any kind of artificial intelligence (AI) classifier may be utilized as the second classifier. For example, any kind of machine learning classifier, neural network classifier, and deep learning classifier may be used. Such artificial intelligence (AI) classifier may be not preconfigured with a rule (such as this in the first classifier).

In embodiments of the present disclosure, the first and/or the second measurement result comprises a feature value of the at least one parameter. For example, one of the first measurement result or the second measurement result may be the originally measured values, and the other one may be the features values generated of the originally measured values. Further, both of them may be the originally measured values, or both of them may be the features values. That is, the first measurement result and the second measurement result may be the same or not, according to practical implementation.

In embodiments of the present disclosure, the feature value is generated based on a plurality of measurement values of the at least one parameter; and the at least one parameter is measured periodically.

In embodiments of the present disclosure, the feature value comprises at least one of: a maximum value of the plurality of measurement values; a minimum value of the plurality of measurement values; and a fluctuation degree of the plurality of measurement values.

According to embodiments of the present disclosure, a feature value of the at least one parameter, rather than the parameter itself, may be used for classifying. The feature value may be more directly associated with the event, and thus improve the efficiency and the accuracy.

In embodiments of the present disclosure, the event comprises: a near silent issue, NSI, of a base station.

In embodiments of the present disclosure, the at least one parameter comprises at least one key performance indictor parameter.

In embodiments of the present disclosure, the key performance indictor parameter comprises at least one of: a quantity number of connected users; a downlink user throughput; and a downlink physical resource block usage.

In embodiments of the present disclosure, the network node comprises an operation, administration and maintenance, OAM.

According to embodiments of the present disclosure, a very rare failure event NSI may be detected with improved accuracy. It should be understood that the embodiments of the present disclosure may be also applicable to other kind of events.

As mentioned, general anomaly detection can't solve the problem perfectly due to too many false alarms. At the same time, it is a small sample problem, a successful solution should leverage the prior expert domain knowledge and adjust the distribution by the samples collected and labelled.

The embodiments of the present disclosure may combine expert domain knowledge(rules) and supervised machine learning model. Expert rules are prior knowledge to narrow down scope and machine learning technology is used to adjust the decision boundary as a further step.

From Bayesian view, prior knowledge provides a base distribution and prior probability of NSI, additional information from data collected will adjust the post distribution or post probability. Namely, a supervised machine learning model can be trained offline with limited samples to mitigate the imbalance problem. The combination of machine learning model and the expert rules demonstrates very good performance on detecting the near silent issue online.

The embodiments of the present disclosure further apply feature engineering over KPI data and build an expert rule set as a base detector(classifier). It then introduces relax parameters to generate relaxed rule detector with adjustable threshold value and cascade the rule detector with a machine learning SVM model to detect the NSI. The relax parameter and SVM hyper parameter is optimized on the classifying score of the cascading detectors. So that the solution could achieve a global optimization in a controlled way.

In practical implementation, the embodiments of the present disclosure could detect the silent issue one hour after it occurred with high accuracy. When it is verified with 9 months' historical data, the embodiments of the present disclosure reported 16 near silent issues, among which there are 13 true near silent issues, 3 false alarms and only 1 near silent issue is not detected.

When the model was activated on-line, it showed the similar performance as expected, similar recall rate but higher precision when compared with expert rules.

Therefore, the embodiments of the present disclosure don't seek a single machine learning model or method to solve the problem. Instead, it uses cascading detectors to tackle this problem.

The base detector uses domain knowledge or experience to decrease the data size, while it allows flexibility to increase the data size by introducing relax parameters, then the data size is finely under control depends on the configuration of the parameters.

So that one advantage of this solution is that it is resistant to outliers. For methods using Euclidean Distance as measurement, a largest value in one dimensional would dominate the distance. The base detector is naturally ruled out those cases. This would decrease the risk of sudden tensive false alarms in real circumstance.

After cascading the machine learning SVM model, the solution utilizes the power of its classification capability to learn the accurate decision boundary in the controlled data set. And in the controlled data set, the extreme class imbalance problem is mitigated.

Moreover, the relax parameters and SVM model parameters are optimized together in evaluation. That means the global optimization is achieved for the cascading detectors. In this way, NSI is more accurately detected and even early detected than using base detector, or machine learning model only.

The proposed solution of one embodiment of the present disclosure is deployed in OAM platform of Radio Access Network. At the OAM platform, KPI data may be collected for each eNodeB, with a time resolution of 15-min ROP (Recording Output Period). Namely, the data may be recorded every 15 minutes. It should be understood that any other time period may also be utilized.

Firstly, the proposed solution utilizes domain knowledge to develop rules to classify NSI. Generally, when NSI occurs, the user number is quickly accumulated, and the user throughput quickly drops to close to zero. This phase is a good timing for detecting NSI, because after that user number and throughput curve shall be flat.

The proposed solution performs feature engineering on KPI data over past 8 ROPs. The KPIs include connected user numbers, downlink user throughput, downlink PRB usage. These 3 KPIs are transformed to 7 features. These features contain the information of the change of KPI during 8 ROPs equal to 2 hours, which are sufficient to measure the near silent issue occurrence.

Assuming current ROP time is time T, then time T-1 is the one ROP before current time. The features are constructed as follows.

Feature_1=Maximum downlink PRB usage from T-3 to T
Feature_2=Minimum connected user numbers from T-3 to T
Feature_3=Maximum connected user numbers from T-3 to T
Feature_4=Connected user numbers at T-7
Feature_5=Minimum downlink user throughput from T-3 to T
Feature_6=Maximum downlink user throughput from T-3 to T
Feature_7=Downlink user throughput at T-7

Based on these features, 5 rules from domain experts are introduced as base rule detector/classifier.

Rule1: Feature_1<=R1_value
Rule2: Feature_2>R2_value
Rule3: Feature_3/Feature_4>R3_value
Rule4: Feature_5/Feature_7<R4_value
Rule5: Feature_6<R5_value It can be seen, in each of these rules, a threshold (R1_value, R2_value, R3_value, R4_value, R5_value) may be set for determining whether the current KPI data satisfies these rules. The specific values for these thresholds may be selected/determined based on the practical implementation.

It should be understood, other parameters, features or other corresponding rules may be selected.

The expert rules set forms a base NSI detector. However, this detector is not perfect over detection, another downstream machine learning model is applied to improve its performance.

Next step, the proposed solution will relax the rules to screen whole historical data which brings more true and false positives. That is, some of them are true NSI but most of them are not. But these rules may control the imbalance rate of whole training data set. For example, the original imbalance ratio 1:10^7, will be improved to 1:3 after applying these rules.

For example, one rule requires that the maximum DL throughput (Feature-6) of previous 4 ROPs to be less than 1000 kbps. Such constraints may be further relaxed with a percentage parameter X % as 1000*(1+X %) kbps. The percentage parameter is a hyper parameter ranging from 5% to 40% in the solution, and is tuned during the model optimization.

The relaxed rules with several threshold values relaxed by parameter vector X=[X0, X1, X2, X3, X4] may be presented below.

RR1: Feature_1<=R1_value*(1+X0)
RR2: Feature_2>R2_value*(1−X1)
RR3: Feature_3/Feature_4>R3_value*(1−X2)
RR4: Feature_5/Feature_7<R4_value*(1+X3)
RR5: Feature_6<R5_value*(1+X4) kbps X0, X1, X2, X3, X4 may be positive values, and thus an upper threshold may be relaxed as bigger, and a lower threshold may be relaxed as smaller. It should be understood that the above formulas are just examples but not limitation of the present disclosure, and other forms that relaxing the rule restriction are also applicable. For example, RR1 may be Feature_1<=R1_value*(1+X0), or may be RR1: Feature_1<=R1_value+X0.

After discarding the data dissatisfying the relaxed rules, a smaller set of data from historical KPI data may be generated/classified. And the data imbalance rate may be changed from extreme imbalance to moderate imbalance. Therefore, the supervised learning classifier can learn a good decision boundary of the NSI issue and non-NSI issue under the relaxed rules which surpass the prediction of naive expert rules.

SVM may be chosen as supervised classification model. In the training phase, 7 features are normalized and hyperparameters are optimized by cross validation. When kernel of SVM is RBF, gamma=0.2, C=1. The gamma is a parameter in RBF which controls the influence of each samples. The C is a regularization parameter in SVM which controls the penalty for classification errors.

The supervised classification model is not limited to SVM. Any kind of artificial intelligence (AI) classifier may be utilized. For example, any kind of machine learning classifier, neural network classifier, and deep learning classifier.

In order to search the best relax parameter vector, the relax parameter vector may be gridded in preset data range over each vector component, e.g. 5% to 40%. We measure the classifying score of the cascading detectors and use the parameters which result in highest classifying score.

Finally, the proposed solution solved this problem in good result. Classifying score (F1 score as below) of near silent issue detection can reach to 85%+, which is a very good result considering the extreme imbalance rate of this problem.

Figure 4:
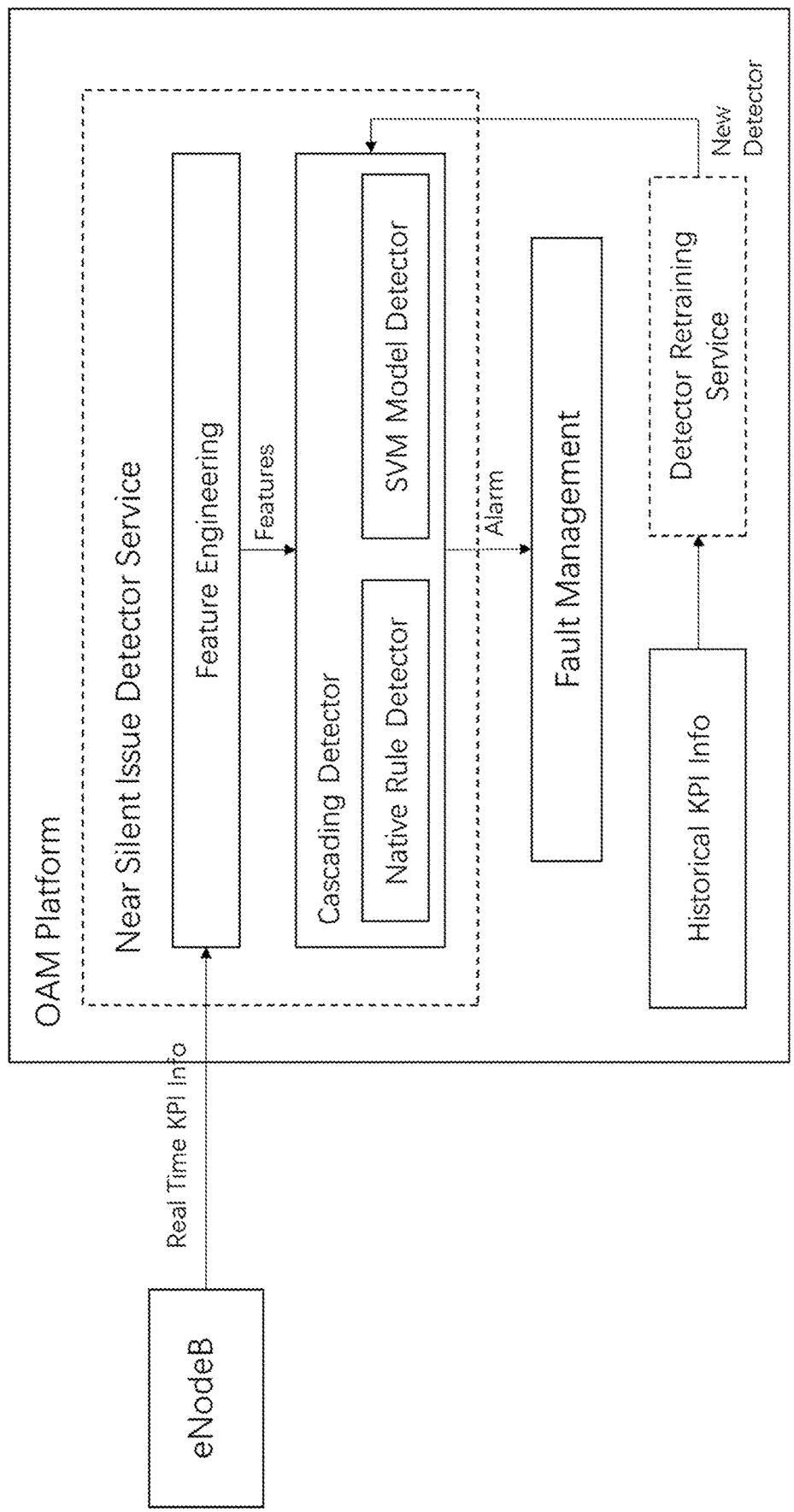
FIG. 4 is an exemplary diagram showing the method performed at an OAM platform, according to embodiments of the present disclosure.

FIG. 4 is an exemplary diagram showing the method performed at an OAM platform, according to embodiments of the present disclosure.

The proposed solution deploys a near silent issue detection service in OAM platform. The service processes real time KPI information from eNodeB to make near silent issue detection.

The used KPI includes connected user numbers, downlink user through put, PRB usage. Feature Engineering is performed over those KPIs to generate appropriate features, such as above mentioned.

Then the features are inputted to the cascaded detector. The cascaded detector includes a first classifier (Native Rule Detector) and a second classifier (SVM Model Detector). The two detectors are cascaded to make detection of NSI. When an NSI is detected, an alarm may be sent to a fault management unit.

Another Detector Retraining service is deployed to retraining the cascading model by using historical KPI information. The retraining service is running periodically, e.g. monthly. During the training, the relaxed parameter and SVM hyper parameter is optimized with the classifying score of NSI detection, to provide new detector (with new thresholds and new model). If the SVM classification model doesn't performs good enough anymore, it could be replaced by other ML (machine learning) classification models and the replacement doesn't impact the architecture of the system.

Figure 5:
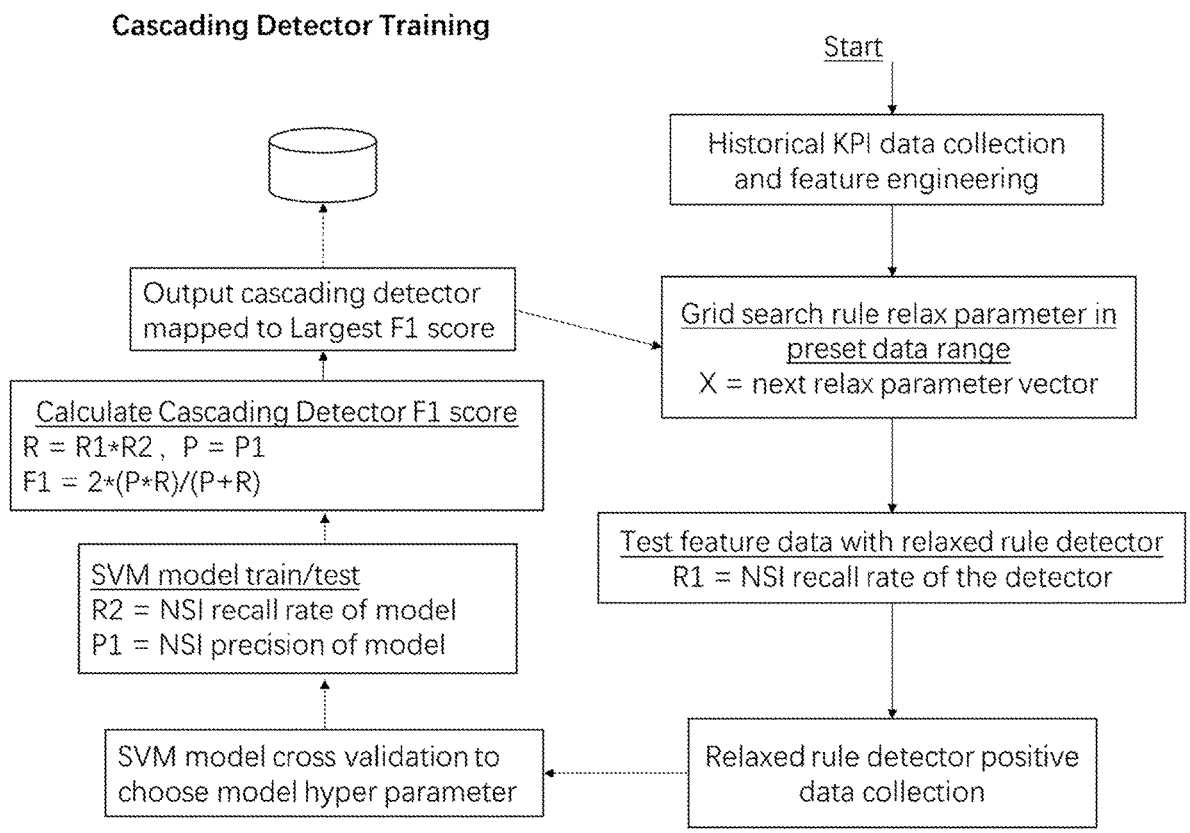
FIG. 5 is an exemplary flow chart showing training process for the cascading detector, according to embodiments of the present disclosure.

FIG. 5 is an exemplary flow chart showing training process for the cascading detector, according to embodiments of the present disclosure.

The Cascading Detector Training process is to optimize the relax parameter vector and SVM hyper parameter to reach the best performance on detection.

After historical KPI data collection and feature engineering, the process starts to grid search rule relax parameter in preset data range over each vector component, e.g. 5% to 40%. In FIG. 5, X is assumed as next relax parameter vector to be testified.

Then a relaxed rule detector is formed to test the feature data and NSI recall/detection rate for the relaxed rule detector is calculated as R1. And all detected positive data (which satisfies all the rules) is then collected for machine learning model training.

For machine learning, kernel SVM classification model is chosen and cross validation method is used to evaluate the SVM hyper parameter and determine the best SVM hyper parameter.

Then we train the SVM model with the best hyper parameter and test, based on the relaxed rule detector positive data, and the NSI recall rate is calculated as R2, NSI precision rate is calculated as P1. A part of the relaxed rule detector positive data may be used for training the SVM model, and another part of relaxed rule detector positive data may be used for testing the SVM model and then determine the R2, P1.

Finally, NSI recall rate for the cascading detector may be calculated as R=R1*R2, the NSI precision rate for the cascading detector as P=P1, and F1 score=2*(P*R)/(P+R).

In this way, the cascading detector mapped to the best classifying score (F1) may be found. The cascading detector includes the relaxed rule detector and SVM trained model.

FIG. 6 is an exemplary diagram showing a data sample, according to embodiments of the present disclosure.

As shown in FIG. 6, Downlink user throughput (DL Tput), connected user numbers, downlink PRB usage from T-7 (first row), to T (last row) are recorded in the table. Then the features (feature-1 . . . feature-7) are calculated. These features may be compared with the rules, and, if needed, be further classified.

The proposed solution created an improved manner to solve the near silent issue detection in RAN products.

The first point is the feature engineering done over connected user numbers, downlink user throughput, downlink PRB usage KPIs. The native rule detector is composed based on the features and could provide a good detector. The expert rules capture three key characters of NSI. Statically, PRB usage and eNB downlink throughput are relatively low. Dynamically, the eNB downlink throughput and RRC connection change quickly. Further, the rules capture underlying relationships among PRB usage, RRC connections. That is, PRB usage is at very low level, down link throughput drops quickly but RRC increases at the same time. eNB has lot of resource, new calls can be setup and subscribers are willing to use the network, but the down link throughput drops quickly.

The second point is to relax rules to solve extremely imbalance. The extreme class imbalance problem may be changed to moderate class imbalance. It is an efficient way to control the size of data to be further classified. With the relax parameter vector optimized with SVM model together using the F1 score metric of the NSI detection, a global optimization in a controlled way is achieved.

The third point is using a Bayesian view to solve small sample problem. With a small number of samples, it is hard to approximate the true distribution. Combining the domain expert rules as priori knowledge along with the labelled data as posterior knowledge is an effective way for distribution approximation.

Figure 7:
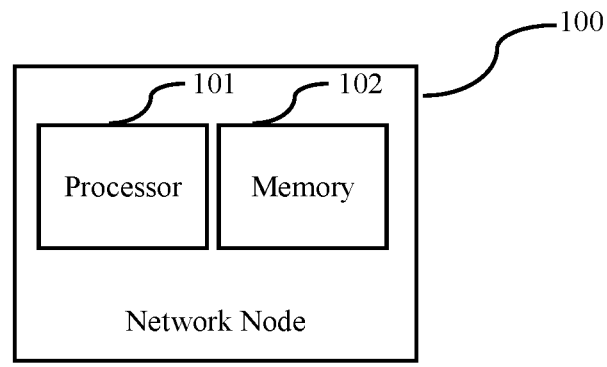
FIG. 7 is a block diagram showing exemplary apparatuses suitable for practicing the network node according to embodiments of the disclosure.

FIG. 7 is a block diagram showing exemplary apparatuses suitable for practicing the network node according to embodiments of the disclosure.

As shown in FIG. 7, the network node 100 may comprise: a processor 101; and a memory 102. The memory 102 contains instructions executable by the processor 101, whereby the network node is operative to: obtain at least one parameter associated to an event; determine, by a first classifier, whether a first measurement result of the at least one parameter satisfies at least one rule; classify, by a second classifier, a second measurement result of the at least one parameter, when the first measurement result of the at least one parameter satisfies the at least one rule; and determine whether the event happens based on a classifying result of the second measurement result of the at least one parameter.

Further, the network node 100 may be operative to perform the method according to any of the above embodiments, such as these shown in FIG. 1-3.

The processors 101 may be any kind of processing component, such as one or more microprocessor or microcontrollers, as well as other digital hardware, which may include digital signal processors (DSPs), special-purpose digital logic, and the like. The memories 102 may be any kind of storage component, such as read-only memory (ROM), random-access memory, cache memory, flash memory devices, optical storage devices, etc.

Figure 8:
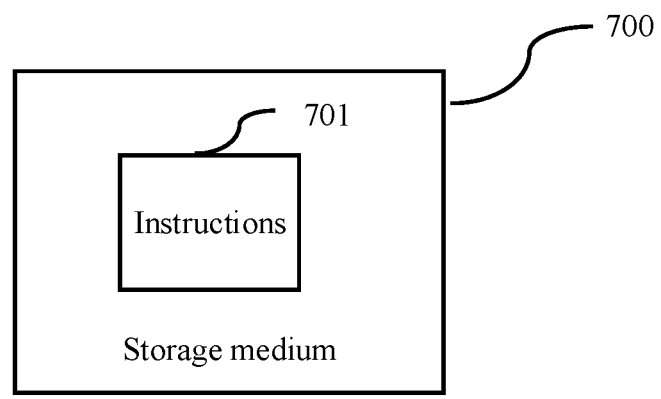
FIG. 8 is a block diagram showing an apparatus readable storage medium, according to embodiments of the present disclosure.

FIG. 8 is a block diagram showing an apparatus readable storage medium, according to embodiments of the present disclosure.

As shown in FIG. 8, the computer-readable storage medium 700, or any other kind of product, storing instructions 701 which when executed by at least one processor, cause the at least one processor to perform the method according to any one of the above embodiments, such as these shown in FIG. 1-3.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

Figure 9:
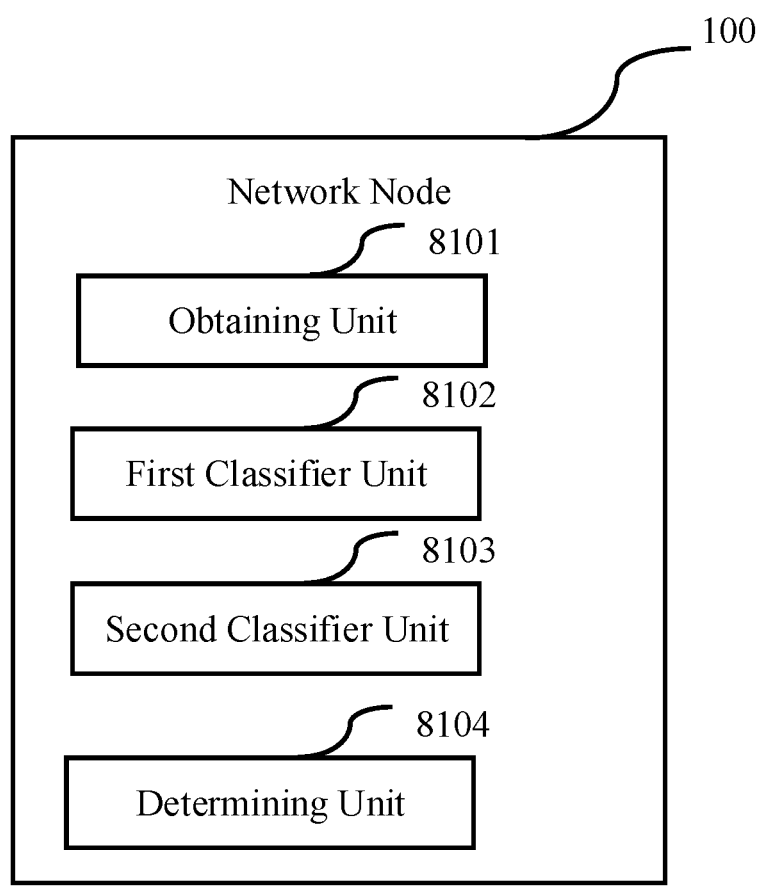
FIG. 9 is a schematic showing units for the network node, according to embodiments of the present disclosure.

FIG. 9 is a schematic showing units for the network node, according to embodiments of the present disclosure.

In embodiments of the present disclosure, the network node 100 may comprise: a obtaining unit 8101, configured to obtain at least one parameter associated to an event; a first classifier unit 8102, configured to determine whether a first measurement result of the at least one parameter satisfies at least one rule; a second classifier unit 8103, configured to classify a second measurement result of the at least one parameter, when the first measurement result of the at least one parameter satisfies the at least one rule; and a determining unit 8104, configured to determine whether the event happens based on a classifying result of the second measurement result of the at least one parameter.

In embodiments of the present disclosure, the terminal device is further operative to perform the method according to any of embodiments above described.

The term 'unit' may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With these units, the network node 100 may not need a fixed processor or memory, any computing resource and storage resource may be arranged from at least one network node/device/entity/apparatus relating to the communication system. The virtualization technology and network computing technology (e.g. cloud computing) may be further introduced, so as to improve the usage efficiency of the network resources and the flexibility of the network.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Particularly, these function units may be implemented either as a network element on a dedicated hardware, as a software instance running on a dedicated hardware, or as a virtualized function instantiated on an appropriate platform, e.g. on a cloud infrastructure.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

| Abbreviation | Explanation |
| --- | --- |
| eNB | Evolved Node B |
| OAM | Operation Administration Maintenance |
| RBF | Radius Basis Function |
| SVM | Support Vector Machine |
| NSI | Near Silent Issue |
| DL | Down Link |
| RRC | Radio Resource Control |
| PRB | Physical Resource Bearer |
| RAN | Radio Access Network |

The invention claimed is:

1. A method performed at a network node for detecting near silent issue (NSI), comprising:
obtaining at least one parameter associated to an event, wherein the event is the NSI and the at least one parameter is used to indicate whether the event happens;
determining, by a first classifier, whether a first measurement result of the at least one parameter satisfies at least one rule;
classifying, by a second classifier, a second measurement result of the at least one parameter, when the first measurement result of the at least one parameter satisfies the at least one rule, wherein the second classifier is a support vector machine (SVM) model detector, in which the first classifier and the second classifier are cascaded to form a cascading detector for NSI detection; and
determining whether the event happens based on a classifying result of the second measurement result of the at least one parameter to detect the NSI.

2. The method according to claim 1, further comprising:
determining a threshold used in the at least one rule as to whether the first measurement result of the at least one parameter satisfies the at least one rule, based on a training result of the second classifier.

3. The method according to claim 2, wherein the threshold comprises a vector.

4. The method according to claim 2, wherein the determining the threshold used in the at least one rule comprises:
obtaining a plurality of samples, wherein each sample includes a historic measurement result of the at least one parameter, and each sample is previously labeled as the event or not the event;
selecting a candidate threshold from a plurality of candidate thresholds;
determining, by the first classifier, whether each sample satisfies the at least one rule including the selected candidate threshold;
training the second classifier with at least one sample which satisfies the at least one rule including the selected candidate threshold;
determining a classifying score of the second classifier associated to the selected candidate threshold, based on a training result; and
determining the selected candidate threshold as the threshold used in the at least one rule, when the selected candidate threshold corresponds to a highest classifying score among the plurality of candidate thresholds.

5. The method according to claim 4, wherein the at least one sample comprises at least one sample labelled as the event and at least one sample labelled as not the event.

6. The method according to claim 1, wherein a kernel of the SVM model detector comprises a Radial Basis Function (RBF).

7. The method according to claim 1,
wherein the first measurement result, the second measurement result, or both the first measurement result and the second measurement result comprises a feature value of the at least one parameter.

8. The method according to claim 7, wherein the feature value is generated based on a plurality of measurement values of the at least one parameter and wherein the at least one parameter is measured periodically.

9. The method according to claim 8, wherein the feature value comprises:
a maximum value of the plurality of measurement values;
a minimum value of the plurality of measurement values;
a fluctuation degree of the plurality of measurement values; or
any combination thereof.

10. The method according to claim 1, wherein the event relates to a base station.

11. The method according to claim 1, wherein the at least one parameter comprises at least one key performance indictor parameter.

12. The method according to claim 11, wherein the at least one key performance indictor parameter comprises:
a quantity number of connected users;
a downlink user throughput;
a downlink physical resource block usage; or
any combination thereof.

13. The method according to claim 1, wherein the network node is an operation, administration and maintenance (OAM) node.

14. A network node for detecting near silent issue (NSI), comprising:
a processor; and
a memory, the memory containing instructions which, when executed by the processor, cause the network node to:
obtain at least one parameter associated to an event, wherein the event is the NSI and the at least one parameter is used to indicate whether the event happens;
determine, by a first classifier, whether a first measurement result of the at least one parameter satisfies at least one rule;
classify, by a second classifier, a second measurement result of the at least one parameter, when the first measurement result of the at least one parameter satisfies the at least one rule, wherein the second classifier is a support vector machine (SVM) model detector, in which the first classifier and the second classifier are cascaded to form a cascading detector for NSI detection; and determine whether the event happens based on a classifying result of the second measurement result of the at least one parameter to detect the NSI.

15. The network node according to claim 14, wherein the network node is further to:
   determine a threshold used in the at least one rule as to whether the first measurement result of the at least one parameter satisfies the at least one rule, based on a training result of the second classifier.

16. The network node according to claim 15, wherein the threshold comprises a vector.

17. The network node according to claim 15, wherein to determine the threshold used in the at least one rule comprises:
   obtain a plurality of samples, wherein each sample includes a historic measurement result of the at least one parameter, and each sample is previously labeled as the event or not the event;
   select a candidate threshold from a plurality of candidate thresholds;
   determine, by the first classifier, whether each sample satisfies the at least one rule including the selected candidate threshold;
   train the second classifier with at least one sample which satisfies the at least one rule including the selected candidate threshold;
   determine a classifying score of the second classifier associated to the selected candidate threshold, based on a training result; and
   determine the selected candidate threshold as the threshold used in the at least one rule, when the selected candidate threshold corresponds to a highest classifying score among the plurality of candidate thresholds.

18. A non-transitory computer-readable storage medium storing instructions which, when executed by at least one processor, cause the at least one processor to perform operations at a network node to detect near silent issue (NSI) comprising:
   obtaining at least one parameter associated to an event, wherein the event is the NSI and the at least one parameter is used to indicate whether the event happens;
   determining, by a first classifier, whether a first measurement result of the at least one parameter satisfies at least one rule;
   classifying, by a second classifier, a second measurement result of the at least one parameter, when the first measurement result of the at least one parameter satisfies the at least one rule, wherein the second classifier is a support vector machine (SVM) model detector, in which the first classifier and the second classifier are cascaded to form a cascading detector for NSI detection; and
   determining whether the event happens based on a classifying result of the second measurement result of the at least one parameter to detect the NSI.

* * * * *